United States Patent
Jeong et al.

(10) Patent No.: US 7,492,742 B2
(45) Date of Patent: Feb. 17, 2009

(54) TERMINAL PLATFORM BOARD FOR MULTI-BAND AND MULTI-CARRIER AND APPARATUS THEREOF

(75) Inventors: Chan-Bok Jeong, Daejeon (KR); Seung-Chan Bang, Daejeon (KR); Soo-Bum Kim, Daejeon (KR); Young-Hoon Kim, Daejeon (KR); Il-Gyu Kim, Seoul (KR); Sang-Woo Nam, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 680 days.

(21) Appl. No.: 11/272,561

(22) Filed: Nov. 9, 2005

(65) Prior Publication Data

US 2006/0126569 A1    Jun. 15, 2006

(30) Foreign Application Priority Data

Dec. 10, 2004   (KR) ................. 10-2004-0104445

(51) Int. Cl.
    *H04B 7/216* (2006.01)
(52) U.S. Cl. .................. 370/335; 370/344; 370/347; 455/553.1; 455/333; 375/148
(58) Field of Classification Search ......... 370/334–336, 370/342–345, 347–350; 455/550.1, 553.1, 455/333; 375/135, 136, 146–148, 222
    See application file for complete search history.

(56) References Cited

U.S. PATENT DOCUMENTS

| | | | |
|---|---|---|---|
| 6,246,681 B1 * | 6/2001 | Humphrey et al. | 370/389 |
| 6,320,877 B1 * | 11/2001 | Humphrey et al. | 370/474 |
| 6,757,761 B1 | 6/2004 | Smith et al. | |
| 6,891,863 B1 * | 5/2005 | Penkler et al. | 370/539 |
| 6,901,072 B1 * | 5/2005 | Wong | 370/389 |
| 6,944,186 B2 * | 9/2005 | Zaun et al. | 370/487 |
| 7,187,687 B1 * | 3/2007 | Davis et al. | 370/419 |
| 7,197,575 B2 * | 3/2007 | Huppenthal et al. | 709/250 |
| 2002/0196809 A1 * | 12/2002 | Agrawal et al. | 370/469 |
| 2005/0094654 A1 * | 5/2005 | Weisler et al. | 370/412 |

FOREIGN PATENT DOCUMENTS

| KR | 2001-0046396 | 6/2001 |
|---|---|---|
| KR | 2001-0064257 | 7/2001 |

\* cited by examiner

*Primary Examiner*—Nhan T Le
(74) *Attorney, Agent, or Firm*—Blakely, Sokoloff, Taylor & Zafman

(57) ABSTRACT

The present invention relates to a terminal board applied to a multi-band and multi-carrier wireless system and an apparatus thereof. The terminal platform apparatus according to an exemplary embodiment of the present invention includes a multi-band multi-carrier terminal platform board, a monitoring device, an RF unit for a multi-band multi-carrier system, and a GPS/power source supply. The multi-band multi-carrier terminal platform board achieves high speed data processing and high quality data transmission by using a plurality of high performance FPGAs, an ARM processor, a DPRAM, and a CardBus interface. The monitoring device performs real-time debugging operations, and the GPS/power source supply supplies a power source to the multi-band multi-carrier terminal platform board.

18 Claims, 4 Drawing Sheets

TERMINAL PLATFORM BOARD FOR MULTI-BAND AND MULTI-CARRIER AND APPARATUS THEREOF

CROSS-REFERENCE TO RELATED APPLICATION

This application claims priority to and the benefit of Korean Patent Application No. 10-2004-0104445 filed in the Korean Intellectual Property Office on Dec. 10, 2004, the entire content of which is incorporated herein by reference.

BACKGROUND OF THE INVENTION (a) Field of the Invention

The present invention relates to a terminal platform board and an apparatus thereof. More particularly, the present invention relates to a terminal board applied to a multi-band and multi-carrier wireless system and an apparatus thereof.

(b) Description of the Related Art

Recently, various modem techniques have been suggested and used, as high speed and quality data processes are required since the need for high capacity data services including high quality image and moving picture services has increased. In addition, it takes a lot of time to develop the modem techniques, to realize and stabilize hardware thereof, and to commercialize an application specific integrated circuit (ASIC). Accordingly, a software modem download platform for performing desired modem functions has been studied to solve the above problem.

While a software modem download platform is disclosed in Korean Patent Application No. 1999-62407, it is difficult to satisfy the requirement of the terminal platform for processing multi-band and multi-carrier signals.

For interfaces between a monitor and the terminal platform board, fourth generation wireless systems require a terminal platform apparatus for processing high quality and speed data at over 100 Mbps. However, the platform board for an international mobile telecommunications-2000 (IMT-2000) terminal process data transmission speed of 10 to 20 Mbps through an advantage systems bus, and other interfaces including the Ethernet, a universal serial bus (USB), and an interface of IEEE1394 have a limit to realizing hardware for securely transmitting data at over 100 Mbps.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a terminal platform board for achieving high speed and high quality data transmission required for a fourth generation wireless system, the terminal platform board for a multi-band and multi-carrier system. An exemplary multi-band multi-carrier terminal platform board according to an embodiment of the present invention includes an interface unit for performing an interface function with an external monitoring device, a codec field-programmable gate array (FPGA) unit, an modem FPGA unit, a dual port random access memory (DPRAM) unit for performing a high speed interface function between a controller and the codec FPGA unit, a memory unit for performing a high speed interface function between the codec FPGA unit and the modem FPGA unit, a digital intermediate frequency (IF) unit, a clock/power source regenerator for supplying a system clock signal received from the RF unit and a power source received from an external GPS/power source supply, and a controller for controlling the interface unit, the codec FPGA unit, the modem FPGA unit, the DPRAM unit, and the memory unit so as to process multi-band multi-carrier signals. The digital intermediate frequency (IF) unit filters a digital signal inputted from the modem FPGA, up-converts the frequency of the signal, converts the signal into an analogue signal, and transmits the analogue signal to an external radio frequency (RF) unit through multi-paths, and the digital IF unit converts the analogue signal inputted from the RF unit into the digital signal, filters the digital signal, and down-converts the frequency of the data signal.

In a further embodiment, an exemplary multi-band multi-carrier terminal platform apparatus includes a monitoring device, a multi-band multi-carrier terminal platform board connected with the monitoring device, an RF unit, and a GPS/power source supply. The monitoring device performs call process, modem control, monitoring, and debugging functions, and performs an interface function with a physical layer. The multi-band multi-carrier terminal platform board includes a DPRAM and a memory for performing high speed interface and modem functions, and processes the multi-band and multi-carrier signals by using a multi-path digital IF unit. The RF unit transmits an RF band signal to the multi-band multi-carrier terminal platform board through the multi-paths after receiving the RF band signal through an antenna, and externally transmits a signal through the antenna after converting the signal received from the multi-band multi-carrier terminal platform board through the multi-paths into the RF band signal. The GPS/power source supply supplies a power source to the multi-band multi-carrier terminal platform board, receives a node-B frame number by using a GPS module, and controls the multi-band multi-carrier terminal platform board to be operated as a base station system.

DETAILED DESCRIPTION OF THE EMBODIMENTS

Figure 1A:
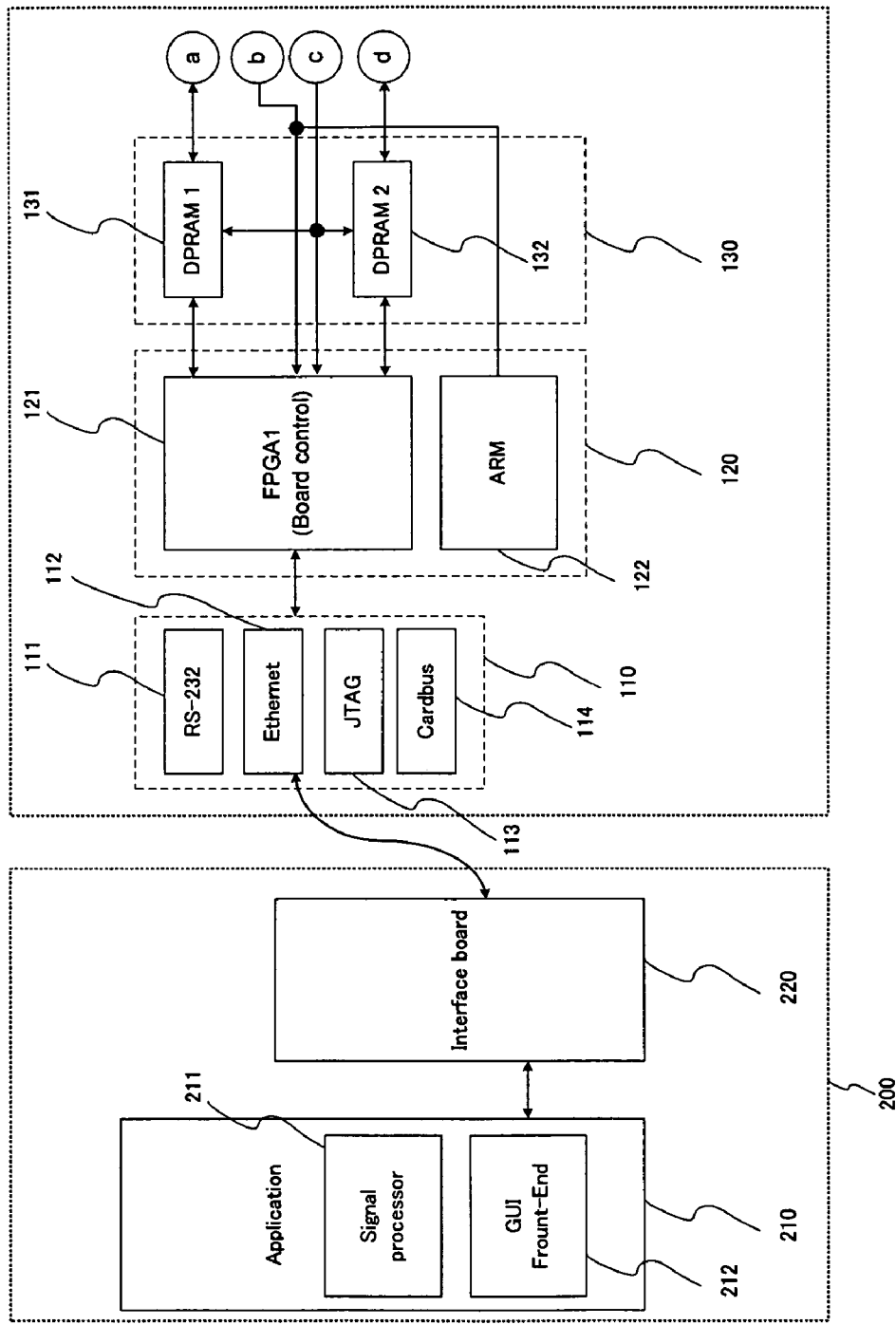
FIGS. 1A and 1B show a block diagram of a configuration of a multi-band multi-carrier terminal platform board and apparatus according to an exemplary embodiment of the present invention.

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a multi-band multi-carrier terminal platform board and apparatus according to an exemplary embodiment of the present invention will be described with reference to the figures.

Figure 1B:
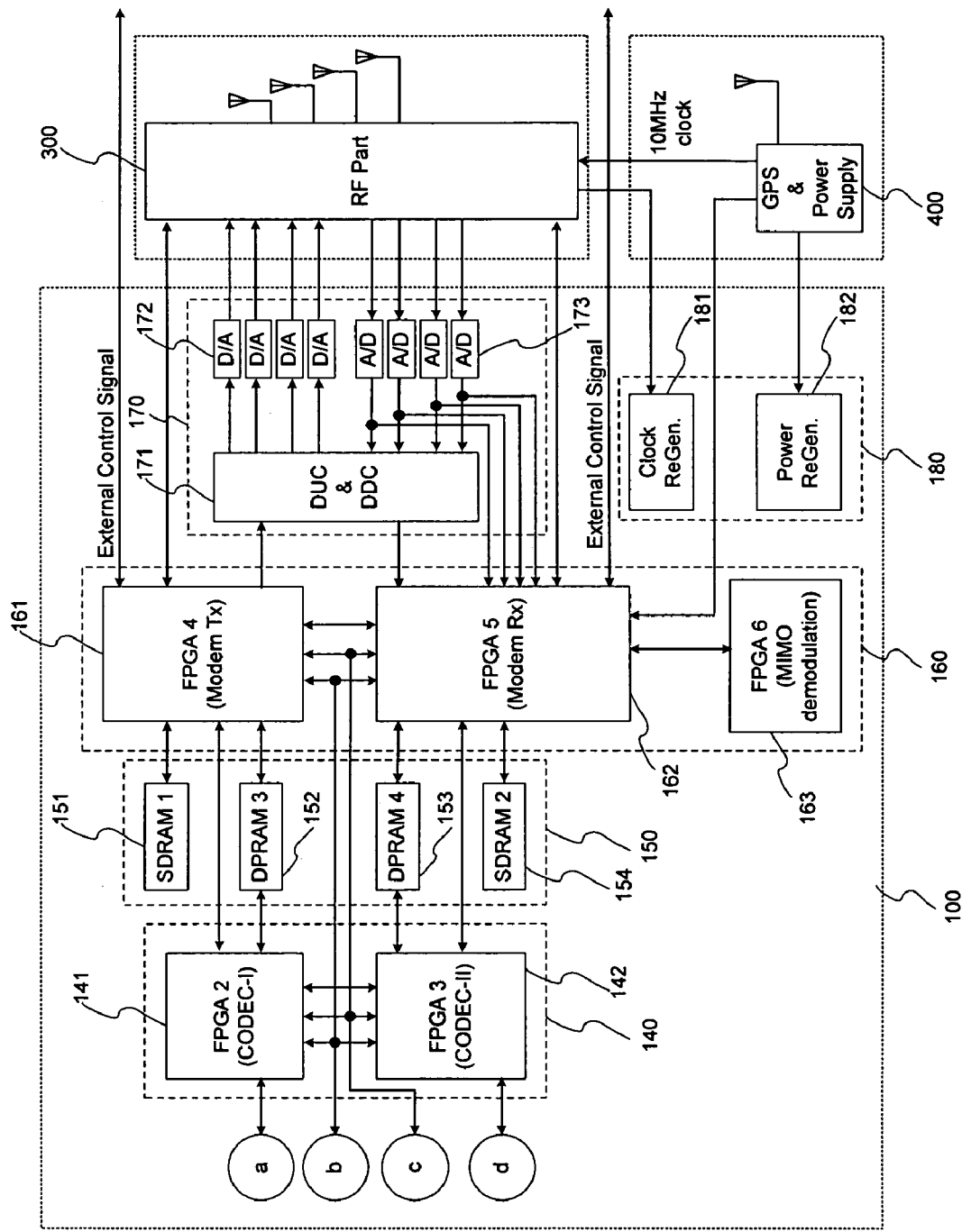

FIGS. 1A and 1B show a block diagram for representing functions of the multi-band multi-carrier terminal platform board and apparatus according to the exemplary embodiment of the present invention.

As shown in FIGS. 1A and 1B, the multi-band multi-carrier terminal platform apparatus according to the exemplary embodiment of the present invention includes a multi-band multi-carrier terminal platform board 100, a monitoring device 200, a radio frequency (RF) unit 300, and a global positioning system (GPS) and power source supply unit 400.

The multi-band multi-carrier terminal platform board 100 for performing functions of a physical layer (first layer) performs a modem function, interfaces with a second layer, and cooperates with the RF unit 300 and the GPS/power source supply 400. Such a multi-band multi-carrier terminal platform board 100 includes an interface unit 110 for interfacing with the monitoring device 200, a controller 120 for performing board control and application, a field-programmable gate array (FPGA) unit 140 used as a coder/decoder (CODEC), a dual port random access memory (DPRAM) unit 130 for performing a high speed interface function between the controller 120 and the FPGA unit 140, an FPGA unit 160 for a modem, a memory unit 150 for a high speed interface function between the FPGA unit 140 and FPGA unit 160, a digital intermediate frequency (IF) unit 170, and a clock/power source regenerator 180.

The interface unit 110 for interfacing with the monitoring device 200 includes a recommended standard-232 (RS-232) connector 111, an Ethernet connector 112, a joint test action group (JTAG) connector 113, and a CardBus connector 114.

The RS-232 connector 111 is connected with the monitoring device 200 in an RS-232 method so that control command transmission and data transmission to the monitoring device 200 are performed, and the Ethernet connector 112 is connected with the monitoring device 200 in an Ethernet communication method including transmission control protocol/Internet protocol (TCP/IP) and user datagram protocol (UDP)/IP so that the control command transmission and data transmission to the monitoring device 200 are performed. The JTAG connector 113 is connected with the monitoring device 200 so that the FPGA units perform real-time debugging and program downloading with the monitoring device 200, and the CardBus connector 114 is connected with the monitoring device 200 so that high speed and quality data transmission of over 100 Mbps required for a fourth generation wireless system is performed.

The controller 120 for performing the board control and application includes an FPGA1 121 and an ARM processor 122.

The FPGA1 121 for controlling the multi-band multi-carrier terminal platform board 100 connects the interface unit 110 and the DPRAM unit 130, and the ARM processor 122 performs an application function of the multi-band multi-carrier terminal platform board 100 so that the multi-band multi-carrier terminal platform board 100 performs terminal functions without the monitoring device 200.

The DPRAM unit 130 for the high speed interface includes a DPRAM1 131 and a DPRAM2 132.

The DPRAM1 131 performs the high speed interface for transmitting uplink transport channel information to an FPGA2 141 in a downlink path, and the DPRAM2 132 performs the high speed interface for transmitting transport channel information transmitted from an FPGA3 142 to an uplink.

The FPGA unit 140 used as the CODEC includes the FPGA2 141 and the FPGA3 142.

The FPGA2 141 used for the downlink performs an encoding function, and the FPGA3 142 used for the uplink performs a decoding function.

The memory unit 150 for the high speed interface includes a synchronous dynamic random access memory 1 (SDRAM1) 151, an SDRAM2 154, a dynamic programmable random access memory 3 (DPRAM3) 152, and a DPRAM4 153.

The SDRAM1 151 performs a memory function for verification of the multi-band multi-carrier terminal platform board 100 in the uplink, the SDRAM2 154 performs a memory function for verification of the multi-band multi-carrier terminal platform board 100 in the downlink, the DPRAM3 152 performs the high speed interface function between the FPGA2 141 and an FPGA4 161, and the DPRAM4 153 performs the high speed interface function between the FPGA3 142 and an FPGA5 162.

The FPGA unit 160 for the modem includes the FPGA4 161, the FPGA5 162, and an FPGA6 163. The FPGA4 161 performs a modulation function in the uplink path, the FPGA5 162 performs a demodulation function in the downlink path, and the FPGA6 163 performs a multi-input multi-output demodulation function in the downlink path.

The digital IF unit 170 includes a digital up converter & digital down converter (DUC & DDC) 171, a plurality of digital to analog (D/A) converters 172, and a plurality of analog to digital (A/D) converters 173.

The DUC & DDC 171 digitally filters a digital signal of a bandwidth satisfying a modem standard requirement (the digital signal inputted from the FPGA4 161), and digitally up-converts the digital signal, combines an inphase/quadrature (I/Q) signal to the digital signal, and transmits the data signal to the D/A 172 in the uplink path. In the downlink path, the DUC & DDC 171 digitally filters the digital signal of the bandwidth satisfying the modem standard requirement (at this time, the digital signal is sampled by the A/D converter 173), digitally down-converts the digital signal, separates the I/Q signal from the digital signal, and transmits the digital signal to the FPGA5 162.

The clock/power source regenerator 180 includes a clock regenerator 181 and a power source regenerator 182. The clock regenerator 181 receives a system clock signal from the RF unit 300, and supplies the system clock signal to the multi-band multi-carrier terminal platform board 100, and the power source regenerator 182 receives a power source from the GPS/power source supply 400, and supplies the power source to the multi-band multi-carrier terminal platform board 100. At this time, a rectification circuit is provided for the respective FPGAs so as to stably supply the power source.

The monitoring device 200 for performing application and functions of second and third layers performs call process control, modem control, monitoring, and debugging functions, and performs an interface function with the first layer.

An application unit 210 in the monitoring device 200 includes a signal processor 211 and a graphic user interface unit (GUI Front-End) 212 for performing a graphic user interface function.

The signal processor 211 for modulating/demodulating a modem baseband signal is used for realizing a modem simulator. In addition, the signal processor 211 performs a monitoring function for the transmitted/received data, the monitoring function including constellation, bit error rate (BER), beam pattern, and measurement functions.

The graphic user interface unit 212 for controlling a personal computer (PC) of the multi-band multi-carrier terminal platform apparatus performs parameter establishment and signal processes, and performs data download/upload with the multi-band multi-carrier terminal platform board 100.

In addition, an interface board 220 performs an interface function between the interface unit 110 of the multi-band multi-carrier terminal platform board 100 and the application unit 210 of the monitoring device 200.

The RF unit 300 may be used in a multi-band multi-carrier system by using a diplexer, and may be used in a singe-band multi-carrier system by using a switch.

The GPS/power source supply 400 includes a GPS module and a power source module, and separates the power source module from the multi-band multi-carrier terminal platform board 100 so as to stably operate the multi-band multi-carrier terminal platform board 100. In addition, the multi-band multi-carrier terminal platform board 100 may be used for a base station system since the GPS/power source supply 400 receives a node-B frame number by using the GPS module, and the multi-band multi-carrier terminal platform board 100 may perform functions of a terminal platform without using a synchronous block when being used as the terminal platform.

Signal flows of the multi-band multi-carrier terminal platform board and apparatus according to the exemplary embodiment of the present invention will be described with reference to FIGS. 1A and 1B.

Firstly, a signal transmitting path of the multi-band multi-carrier terminal platform board and apparatus according to the exemplary embodiment of the present invention will be described.

The FPGA1 121 for the board control receives data from the second layer, and transmits the data to the FPGA2 141 through the data interface of the DPRAM1 131. The FPGA2 141 transmission channel (Trch) encodes the data and transmits the data to the FPGA4 161 through the data interface of the DPRAM3 152, and the FPGA4 161 modulates the data and transmits the data to the DUC & DDC 171 in the digital IF unit 170. A baseband signal inputted to the DUC & DDC 171 is converted into an IF signal, the IF signal is converted from a digital signal into an analogue signal by the D/A converter 172, and the analogue signal is transmitted through the RF unit 300.

A signal receiving path of the multi-band multi-carrier terminal platform board and apparatus according to the exemplary embodiment of the present invention will now be described.

The analogue signal transmitted from the RF unit 300 is converted into the digital signal by the A/D converter 173, and the IF signal is converted into a baseband signal by the DUC & DDC 171. The FPGA5 162 demodulates the transmitted signal, and the FPGA6 163 obtains desired receipt information by MIMO-demodulating the signal. An obtained information signal is transmitted to the FPGA3 142 through the data interface of the DPRAM4 153, and is Trch decoded by the FPGA3 142. Then, the signal is transmitted to the monitoring device 200 through the data interface of the DPRAM2 132 and the FPGA1 121 for the board control, and therefore the terminal platform board is cooperated with the second layer.

At this time, the FPGA2 141 and the FPGA3 142 may be cooperated with each other so as to perform debugging operations of Trch encoding and Trch decoding blocks, and the FPGA4 161 and the FPGA5 162 may be cooperated with each other so as to perform debugging operations of modem modulation and modem demodulation blocks.

The SDRAM1 151 and the SDRAM2 154 store a large volume of transmitted/received data so as to use the data for performing block debugging operations.

The clock regenerator 181 in the clock/power source regenerator 180 receives a system clock signal from the RF unit 300, and supplies the system clock signal to the multi-band multi-carrier terminal platform board 100, and the power source regenerator 182 receives a power source from the GPS/power source supply 400, and supplies the power source to the multi-band multi-carrier terminal platform board 100. At this time, a rectification circuit is provided for the respective FPGAs so as to stably supply the power source.

Figure 2A:
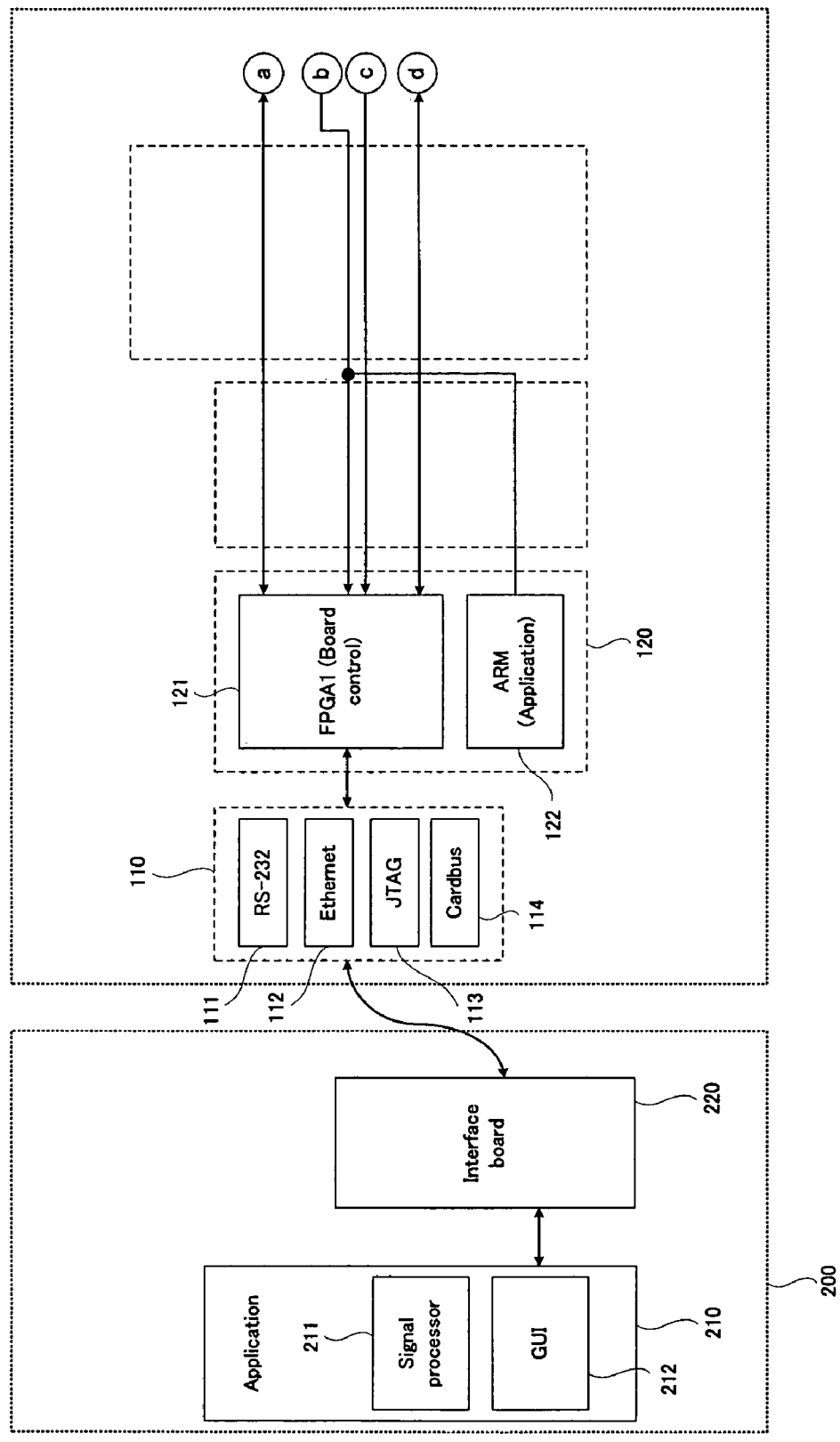
FIGS. 2A and 2B show a block diagram for representing a non-real-time process for developing terminal and base station modems according to the exemplary embodiment of the present invention.
Figure 2B:
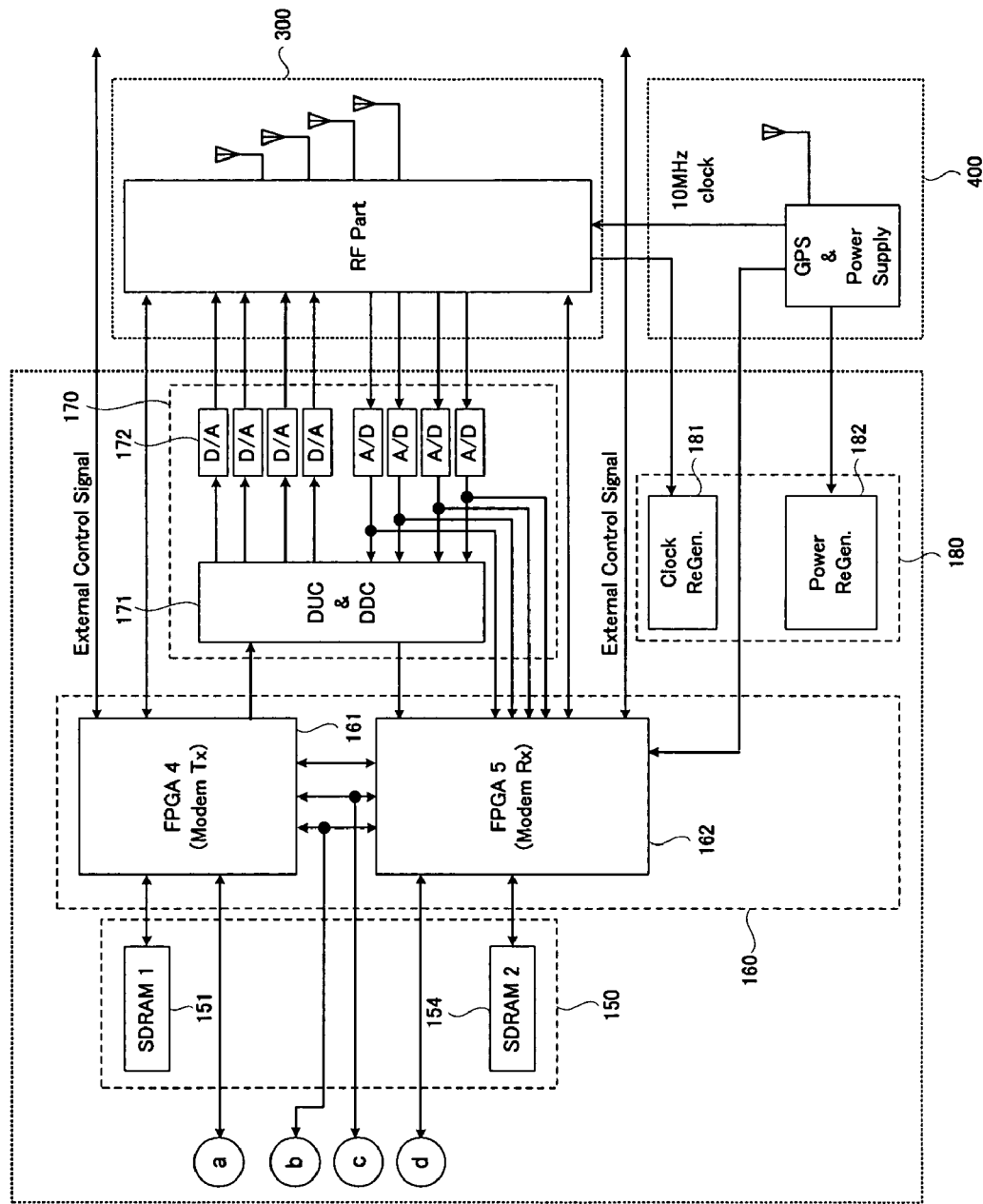

FIGS. 2A and 2B show a block diagram for representing a non-real-time process for developing terminal and base station modems according to the exemplary embodiment of the present invention.

A configuration shown in FIGS. 2A and 2B is for reducing a time for realizing a multi-band multi-carrier terminal according to the exemplary embodiment of the present invention, and the configuration shown in FIGS. 2A and 2B is the same as shown in FIGS. 1A and 1B except that the DPRAM unit 130, the FPGA unit 140 for CODEC, the memory unit 150, and the FPGA6 163 are omitted in FIGS. 2A and 2B Since the CODEC (encoder/decoder), MODEM (modulator/demodulator), and MIMI demodulator in the configuration shown in FIGS. 1A and 1B are formed as software in the multi-band multi-carrier terminal platform board and apparatus for a non-real-time data process according to the exemplary embodiment of the present invention, a simulator may be previously developed. Therefore, performance of actual modem units may be verified, and the number of FPGAs may be reduced.

The multi-band multi-carrier terminal platform board 100 cooperates with the data interface with the second layer, the RF unit 300, and the GPS/power source supply 400.

The monitoring device 200 for performing the application and the functions of the second and third layers performs the call process control, the modem control, the monitoring, and the debugging functions. In the monitoring device 200, the physical layer (first layer) (i.e., CODEC, modem, and MIMO demodulation hardware) described in FIGS. 1A and 1B is realized as software so that the data to be transmitted is modulated and the data to be received is demodulated. In addition, the monitoring device 200 performs the data interface with the multi-band multi-carrier terminal platform board 100.

The RF unit 300 and the GPS/power supply 400 shown in FIGS. 2A and 2B perform the same function as the RF unit 300 and the GPS/power supply 400 shown in FIGS. 1A and 1B. The RF unit 300 shown in FIGS. 2A and 2B additionally performs automatic gain control, automatic frequency control, and transmission power control functions.

A signal transmitting flow of the multi-band multi-carrier terminal platform board and apparatus shown in FIGS. 2A and 2B will be described.

Modulated data transmitted from the second layer is transmitted to the FPGA1 121 for the board control, and is transmitted to the DUC & DDC 171 in the digital IF unit 170 through the data interface of the FPGA4 161. A baseband signal inputted to the DUC & DDC 171 is converted into an IF signal, the IF signal is converted from a digital signal into an analogue signal by the D/A converter 172, and the analogue signal is transmitted through the RF unit 300.

In the following, a signal receiving flow will be described.

The analogue signal transmitted from the RF unit 300 is converted into the digital signal by the A/D converter 173, and the IF signal is converted into a baseband signal by the DUC & DDC 171. The signal is transmitted to the monitoring device 200 through the FPGA5 162 for performing the received data interface function and the FPGA1 121 for the board control, and therefore the terminal platform board is cooperated with the second layer.

According to the exemplary embodiment of the present invention, the FPGA1 121 for controlling the board is separately formed, the ARM processor 122 for operating an application program is formed, the high performance FPGA 160 for the modem functions is formed, the memory unit 150 for the high speed interface and modem functions is formed, a total function of the board is separately performed, and the CardBus 114 is used for the interface with the monitoring device. Accordingly, high speed and quality data transmission of over 100 Mbps for the fourth generation wireless system may be performed, the terminal functions having a low data rate are easily realized as the software in the monitoring device, and therefore the time needed for manufacturing and development may be shortened.

In addition, the DPRAM is formed for the modem and high speed interface functions. A multipurpose system platform may be provided by using 4-path digital IF and RF, in which the multi-band multi-carrier system using the diplexer and the single-band multi-carrier system using the switch may be used.

The board may be stably operated since the power source module is separated from the multi-band multi-carrier terminal platform board and the power source is stably supplied by forming the rectification circuit in the respective FPGAs.

Since the GPS module is separately formed in the multi-band multi-carrier terminal platform apparatus, the terminal platform for quickly performing the terminal functions without using the synchronous block and the base station platform for developing the base station system may be used by using the GPS module.

Real-time monitoring and debugging operations may be performed through the RS-232 and the Ethernet interface, a real-time board control operation may be performed by the real-time debugging and program downloading operations of the FPGA by using the JTAG connector, and various modems may be developed with a short development time since real-time data input/output is performed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A multi-band multi-carrier terminal platform board comprising:
    an interface unit for performing an interface function with an external monitoring device;
    a codec field-programmable gate array (FPGA) unit for coding and decoding (CODEC) functions;
    a modem FPGA unit for modulating and demodulating (MODEM) functions;
    a dual port random access memory (DPRAM) unit for performing a high speed interface function between a controller and the codec FPGA unit for CODEC;
    a memory unit for performing a high speed interface function between the codec FPGA unit and the modem FPGA unit;
    a digital intermediate frequency (IF) unit for filtering a digital signal inputted from the modem FPGA, up-converting the frequency of the signal, converting the signal into an analogue signal, and transmitting the analogue signal to an external radio frequency (RF) unit through multi-paths, the digital IF unit for converting the analogue signal inputted from the RF unit into the digital signal, filtering the digital signal, and down-converting the frequency of the data signal;
    a clock/power source regenerator for supplying a system clock signal received from the RF unit and supplying a power source received from an external GPS/power source supply; and
    the controller for controlling the interface unit, the codec FPGA unit, the modem FPGA unit, the DPRAM unit, and the memory unit so as to process a multi-band and multi-carrier signal.

2. The multi-band multi-carrier terminal platform board of claim 1, wherein the interface unit comprises:
    a recommended standard-232 (RS-232) connector coupled to the monitoring device in an RS-232 manner and performing control command transmission and data transmission with the monitoring device;
    an Ethernet connector coupled to the monitoring device in an Ethernet manner and performing the control command transmission and the data transmission with the monitoring device;
    a joint test action group (JTAG) connector for controlling the controller to be connected to the monitoring device so as to perform real-time debugging and program downloading; and
    a CardBus connector for performing a connection function for data transmission to the monitoring device.

3. The multi-band multi-carrier terminal platform board of claim 1, wherein the controller comprises:
    a first FPGA for connecting the interface unit to the DPRAM unit and controlling the multi-band multi-carrier terminal platform board; and
    an ARM processor for performing application and controlling the multi-band multi-carrier terminal platform board so that the multi-band multi-carrier terminal platform board may independently perform a terminal function.

4. The multi-band multi-carrier terminal platform board of claim 1, wherein the codec FPGA unit comprises a second FPGA for performing a coding function in a downlink path and a third FPGA for performing a decoding function in an uplink path.

5. The multi-band multi-carrier terminal platform board of claim 1, wherein the modem FPGA unit comprises:
    a fourth FPGA for performing a modulation function in the uplink path;
    a fifth FPGA for performing a demodulation function in the downlink path; and
    a sixth FPGA for performing a multi-input/multi-output (MIMO) demodulation function in the downlink path.

6. The multi-band multi-carrier terminal platform board of claim 4, wherein the DPRAM unit comprises:
    a first DPRAM for performing a high speed interface function so as to transmit up-transmission channel information to the second FPGA in the downlink path; and
    a second DPRAM for performing the high speed interface function so as to transmit the transmission channel information received from the second FPGA in the uplink.

7. The multi-band multi-carrier terminal platform board of claim 4, wherein the memory unit comprises:
    a third DPRAM for performing the high speed interface function between the second FPGA and the fourth FPGA; and
    a fourth DPRAM for performing the high speed interface function between the third FPGA and the fifth FPGA.

8. The multi-band multi-carrier terminal platform board of claim 7, wherein the memory unit comprises:
    a first synchronous dynamic random access memory (SDRAM) for storing transmitted data, and performing a memory function for verification of the uplink multi-band multi-carrier terminal platform board; and
    a second SDRAM for storing received data, and performing a memory function for verification of the downlink multi-band multi-carrier terminal platform board.

9. The multi-band multi-carrier terminal platform board of claim 5, wherein the digital IF unit comprises:

a plurality of digital/analogue (A/D) converters for converting a analogue signal received from the RF unit into a digital signal in the downlink path;

a digital up converter & digital down converter (DUC & DDC) for receiving the digital signal of a bandwidth satisfying a modem standard requirement from the fourth FPGA, digitally filtering the digital signal, digitally up-converting the digital signal, combining an inphase/quadrature (I/Q) signal to the digital signal in the uplink path, the DUC & DDC for digitally filtering the digital signal of the bandwidth satisfying the modem standard requirement (at this time, the digital signal is sampled by the D/A converter), digitally down-converting the digital signal, separating the I/Q signal from the digital signal, and transmitting the signal to the fifth FPGA; and a plurality of D/A converters for converting the digital signal outputted from the DUC & DDC into the analogue signal and transmitting the analogue signal to the RF unit in the uplink path.

10. The multi-band multi-carrier terminal platform board of claim 1, wherein the clock/power source regenerator comprises:

a clock regenerator for receiving a system clock signal from the RF unit and supplying the system clock signal to the multi-band multi-carrier terminal platform board; and a power source regenerator for receiving a power source from the GPS/power source supply and supplying the power source to the multi-band multi-carrier terminal platform board.

11. The multi-band multi-carrier terminal platform board of claim 10, wherein a rectification circuit for stably supplying the power source generated by the power source regenerator is formed in the respective FPGAs.

12. The multi-band multi-carrier terminal platform board of claim 4, wherein the second FPGA and the third FPGA are cooperated with each other in order to perform encoding and decoding debugging operations on the transmission channel, and the fourth FPGA and the fifth FPGA are cooperated with each other in order to perform debugging operations on the modem modulation and modem demodulation.

13. The multi-band multi-carrier terminal platform board of claim 1, wherein the controller, the codec FPGA unit, the DPRAM unit, and the memory unit are formed as software so as to perform a non-real-time data process.

14. A multi-band multi-carrier terminal platform apparatus for processing a multi-band and multi-carrier signal, comprising:

a monitoring device for performing call process, modem control, monitoring, and debugging functions, and performing an interface function with a physical layer;

a multi-band multi-carrier terminal platform board connected with the monitoring device, including a DPRAM and a memory for performing high speed interface and modem functions, and processing the multi-band and multi-carrier signals by using a multi-path digital IF unit;

an RF unit for transmitting an RF band signal to the multi-band multi-carrier terminal platform board through the multi-path after receiving the RF band signal through an antenna, and externally transmitting a signal through the antenna after converting the signal received from the multi-band multi-carrier terminal platform board through the multi-path into the RF band signal; and a GPS/power source supply for supplying a power source to the multi-band multi-carrier terminal platform board, receiving a node-B frame number by using a GPS module, and controlling the multi-band multi-carrier terminal platform board to be operated as a base station system.

15. The multi-band multi-carrier terminal platform apparatus of claim 14, wherein the multi-band multi-carrier terminal platform board comprises:

an interface unit coupled to the monitoring device, and performing an interface function with the monitoring device;

an codec FPGA unit for performing coding and decoding functions;

an modem FPGA unit for performing modulation and demodulation functions;

a DPRAM for performing a high speed interface function between a controller and the codec FPGA unit;

a memory unit for performing a high speed interface function between the codec FPGA unit and the modem FPGA;

a digital IF unit for filtering a digital signal inputted from the modem FPGA, up-converting the frequency of the signal, converting the signal into an analogue signal, and transmitting the analogue signal to the RF unit through multi-paths, the digital IF unit for converting the analogue signal inputted from the RF unit into a digital signal, filtering the digital signal, and down-converting the frequency of the digital signal;

a clock/power source regenerator for supplying a system clock signal provided by the RF unit and a power source provided by the GPS/power source supply; and the controller for controlling the interface unit, the codec FPGA unit, the modem FPGA unit, the DPRAM unit, and the memory unit so as to process multi-band and multi-carrier signals.

16. The multi-band multi-carrier terminal platform apparatus of claim 14, wherein the monitoring device comprises:

an interface board coupled to the multi-band multi-carrier terminal platform board, and performing an interface function with the multi-band multi-carrier terminal platform board; and an application unit including a signal processor for processing a baseband modulation/demodulation signal and monitoring transmitted/received data, and a graphic user interface unit connected to an external computer and performing data download/upload with the multi-band multi-carrier terminal platform board.

17. The multi-band multi-carrier terminal platform apparatus of claim 14, wherein the RF unit includes a diplexer and a switch, the multi-band multi-carrier terminal platform apparatus operates as a multi-band multi-carrier system by using the diplexer, and the multi-band multi-carrier terminal platform apparatus operates as a single-band multi-carrier system by using the switch.

18. The multi-band multi-carrier terminal platform apparatus of claim 14, wherein the controller, the codec FPGA unit, the DPRAM unit, and the memory unit are formed as software so as to perform a non-real-time data process, and the RF unit performs automatic gain control, automatic frequency control, and transmission power control functions.

* * * * *